(12) United States Patent
Aoki

(10) Patent No.: US 7,828,033 B2
(45) Date of Patent: Nov. 9, 2010

(54) METHOD OF MANUFACTURING MULTILAYER CAPACITOR AND MULTILAYER CAPACITOR

(75) Inventor: Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/695,510

(22) Filed: Jan. 28, 2010

(65) Prior Publication Data

US 2010/0126657 A1    May 27, 2010

Related U.S. Application Data

(62) Division of application No. 11/490,068, filed on Jul. 21, 2006, now Pat. No. 7,688,567.

(30) Foreign Application Priority Data

Aug. 5, 2005   (JP)   ............... 2005-228000
Sep. 27, 2005  (JP)   ............... 2005-280454

(51) Int. Cl.
| B65C 9/18 | (2006.01) |
| B29C 65/00 | (2006.01) |
| B32B 37/00 | (2006.01) |
| B65H 37/00 | (2006.01) |
| G05G 15/00 | (2006.01) |
| H01G 4/005 | (2006.01) |
| H01G 4/228 | (2006.01) |
| H01G 4/06 | (2006.01) |
| H01G 4/20 | (2006.01) |

(52) U.S. Cl. ............. 156/541; 156/349; 156/538; 156/539; 156/540; 361/306.3; 361/321.2; 361/311; 361/303; 361/306.1; 361/309; 361/313

(58) Field of Classification Search .............. 361/306.3, 361/321.2, 311, 303, 306.1, 309, 313; 156/538–541, 156/349

See application file for complete search history.

(56) References Cited

U.S. PATENT DOCUMENTS 4,556,929 A * 12/1985 Tanaka et al. ............ 361/321.2
4,750,084 A *  6/1988 Nikaidoh et al. ......... 361/321.2
6,069,786 A    5/2000 Horie et al.

(Continued)

FOREIGN PATENT DOCUMENTS

CN   1629991 A   6/2005

(Continued)

*Primary Examiner*—Khanh Nguyen
*Assistant Examiner*—Matthew Hoover
(74) *Attorney, Agent, or Firm*—Oliff & Berridge, PLC

(57) ABSTRACT

A method of manufacturing a multilayer capacitor comprises a first layer forming step, a first electrode forming step, a second layer forming step, a second electrode forming step, a separation step, an element forming step and a terminal forming step. In the first layer forming step, a first ceramic green layer is formed on a supporting body. In the first electrode forming step, a first electrode pattern is formed on the first ceramic green layer. In the second layer forming step, a second ceramic green layer is formed laminated on the first ceramic green layer. In the second electrode forming step, a second electrode pattern is formed at the second ceramic green layer. In the separation step, the support body is separated from the laminated body. In the element forming step, elements are formed by laminating a plurality of the laminated bodies.

7 Claims, 8 Drawing Sheets

U.S. PATENT DOCUMENTS

| | | |
|---|---|---|
| 6,327,134 B1 | 12/2001 | Kuroda et al. |
| 2003/0026059 A1 | 2/2003 | Togashi |

FOREIGN PATENT DOCUMENTS

| | | |
|---|---|---|
| JP | A-60-201608 | 10/1985 |
| JP | A-60-254608 | 12/1985 |
| JP | A-61-253811 | 11/1986 |
| JP | A-03-129811 | 6/1991 |
| JP | A-06-310366 | 11/1994 |
| JP | A-06-349666 | 12/1994 |
| JP | A-10-97947 | 4/1998 |
| JP | A-10-241991 | 9/1998 |
| JP | A-2000-124057 | 4/2000 |
| JP | A-2001-110673 | 4/2001 |
| JP | A-2002-198249 | 7/2002 |
| JP | A-2004-047707 | 2/2004 |
| JP | A-2005-104783 | 4/2005 |
| JP | A-2005-108890 | 4/2005 |

\* cited by examiner

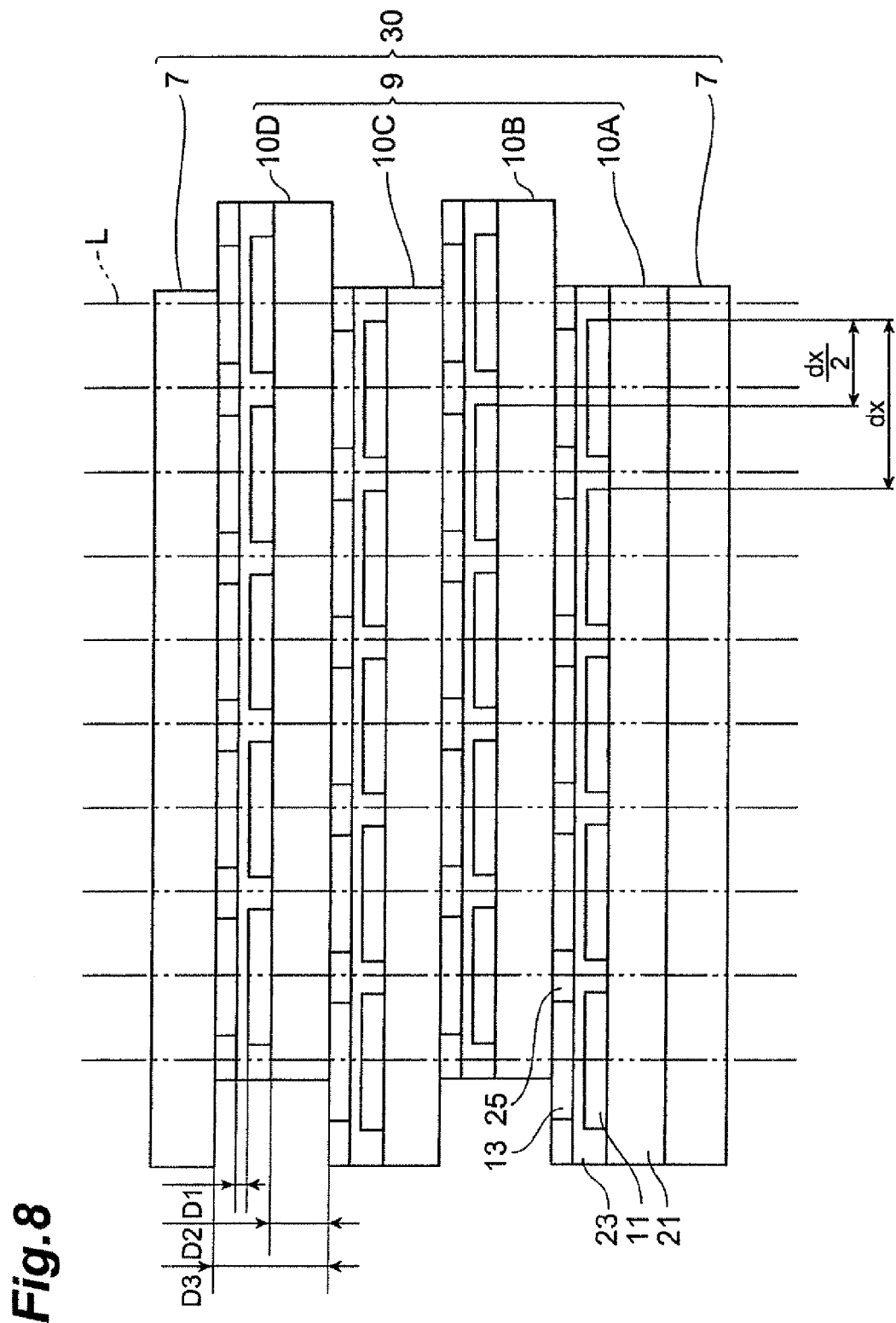

METHOD OF MANUFACTURING MULTILAYER CAPACITOR AND MULTILAYER CAPACITOR

This is a Division of application Ser. No. 11/490,068 filed Jul. 21, 2006. The disclosure of the prior application is hereby incorporated by reference herein in its entirety. This application claims priority under 35 USC 119 from Japanese Application Nos. 2005-228000, filed Aug. 5, 2005 and 2005-280454, filed Sep. 27, 2005, the disclosure of which is incorporated by reference herein.

BACKGROUND OF THE INVENTION

1. Field of the Invention

The present invention relates to a method of manufacturing a multilayer capacitor and a multilayer capacitor.

2. Description of the Related Art

As methods of manufacturing a multilayer capacitor, the following methods of forming an element are previously known (see Laid-open Japanese Patent Application No. 2002-198249). First of all, a single ceramic green layer is formed on a support body. The support body is separated from the single ceramic green layer that was formed and an electrode pattern is formed on the upper surface of the ceramic green layer that has thus been separated. A laminated body is formed by laminating a plurality of such ceramic green layers formed with an electrode pattern.

SUMMARY OF THE INVENTION

In recent years, in order to achieve large electrostatic capacity of multilayer capacitors, the gap between the laminated layers of the electrode pattern has been reduced by decreasing the thickness of the ceramic green layer. However, if the thickness of the ceramic green layer is made small, it becomes difficult to separate the support body from the ceramic green layer. The releasing face of the ceramic green layer therefore tends to be deformed. In a multilayer capacitor that is manufactured by laminating such ceramic green layers, lamination defects such as formation of gas bubbles between the laminated ceramic green layers occur. Such lamination defects are a cause of defective performance of the multilayer capacitor and cause separation (delamination) between the laminated layers.

The present invention was created in order to solve the above problems, its object being to provide a method of manufacturing a multilayer capacitor and a multilayer capacitor wherein defective lamination of the ceramic green layers is suppressed.

A method of manufacturing a multilayer capacitor according to the present invention is characterized by comprising: a first layer forming step wherein a first ceramic green layer is formed on a support body; a first electrode forming step wherein a first electrode pattern is formed on a upper surface of the first ceramic green layer; a second layer forming step wherein a second ceramic green layer is formed by laminating onto a upper surface of the first ceramic green layer and the upper surface of the first electrode pattern; a second electrode forming step wherein a second electrode pattern at a upper surface of the second ceramic green layer is formed in a location where the second electrode pattern and the first electrode pattern mutually overlap as seen from a direction of lamination; a separation step of separating the support body from a laminated body obtained by laminating the first ceramic green layer, the first electrode pattern, the second ceramic green layer and the second electrode pattern; an element forming step of preparing a plurality of the laminated bodies from which the support bodies are separated and forming an element by laminating the plurality of the laminated bodies; and a terminal forming step wherein a first terminal electrode is formed on a outer surface of the element such as to connect with the first electrode pattern and the second electrode pattern included in a prescribed laminated body of the plurality of the laminated bodies and a second terminal electrode is formed on the outer surface of the element such as to connect with the first electrode pattern and the second electrode pattern included in a prescribed laminated body of the plurality of the laminated bodies.

In the method of manufacturing the multilayer capacitor according to the present invention, the support body is separated from the laminated body after forming on the support body the laminated body that is formed with the first ceramic green layer, the first electrode pattern, the second ceramic green layer and the second electrode pattern. In this way, the thickness of the laminated body when separated from the support body can be set to a large thickness even at the stage of being separated from the support body after lamination of a single ceramic green layer and a single electrode pattern. Consequently, separation of the support body from the laminated body is facilitated, and deformation of the releasing surface of the laminated body can thereby be suppressed. Consequently, lamination defects of the ceramic green layer in the multilayer capacitor can be suppressed by laminating the laminated bodies having less deformation of the releasing faces.

Preferably, in the first electrode forming step, a plurality of the first electrode patterns are formed arranged in two-dimensional fashion; in the second layer forming step, the second ceramic green layer is formed laminated on the upper surface of the first ceramic green layer and a upper surface of the plurality of first electrode patterns; in the second electrode forming step, a plurality of the second electrode patterns are formed arranged in two-dimensional fashion so as to mutually overlap with the plurality of the first electrode patterns, respectively, seen from the direction of lamination, at the upper surface of the second ceramic green layer; in the element forming step, an aggregate is formed by laminating the plurality of the laminated bodies such that the first electrode patterns that are adjacent in the lamination direction of these laminated bodies are offset by a prescribed pitch in a prescribed direction of arrangement of the first electrode patterns; and a plurality of elements are formed by cutting the aggregate at first cutting planes passing between adjacent the first electrode patterns that are parallel with the prescribed direction of arrangement, and at second cutting planes, which are planes between adjacent the first electrode patterns that are perpendicular to the prescribed direction of arrangement and planes passing through a centers of first electrode patterns that are perpendicular to the prescribed direction of arrangement.

In this case, since the plurality of elements are formed by cutting at the first cutting planes and the second cutting planes after the plurality of the first electrode patterns and the plurality of the second electrode patterns are formed arranged in two-dimensional fashion so as to mutually overlap and the aggregate is formed by laminating the laminated bodies such that these are offset by the prescribed pitch, the multilayer capacitors described above can be formed efficiently. Consequently, a plurality of the multilayer capacitors can be efficiently manufactured while suppressing lamination defects of the ceramic green layer.

Preferably, in the first layer forming step, the electrostatic capacity of the multilayer capacitor is adjusted by adjusting a thickness of the first ceramic green layer.

In this case, the thickness of the laminated bodies when the supporting bodies are separated is set to the thickness at which separation can easily be achieved, and the thickness of the first ceramic green layers can be adjusted. Consequently, the electrostatic capacity of the multilayer capacitors can easily be adjusted.

Preferably, in the second electrode forming step, a outline of the second electrode pattern is formed so as to be further on the inside as seen from the direction of lamination than a outline of the first electrode pattern.

In this case, the outline of the second electrode pattern excluding the cutting line defined by the second cutting plane in the element is formed so as to be further on the inside as seen from the direction of lamination than the outline of the corresponding first electrode pattern. Due to this, variability of the area of overlap of the first electrode pattern and the second electrode pattern contained in one laminated body in the element can be suppressed. Consequently, it is possible to suppress variability of the area of overlap as seen from the direction of lamination of the first electrode pattern and the second electrode pattern contained in one of adjacent laminated bodies and the first electrode pattern and the second electrode pattern contained in the other laminated body. Variability of the electrostatic capacity of the multilayer capacitors can therefore be suppressed.

A multilayer capacitor according to the present invention is characterized in that there are provided: an element wherein a plurality of dielectric layers are laminated; a first terminal electrode formed at a outer surface of the element; a second terminal electrode electrically insulated from the first terminal electrode and formed at the outer surface of the element; a plurality of first groups of inner electrodes including a first inner electrode and a second inner electrode that are electrically connected with the first terminal electrode and that are mutually adjacent in a direction of lamination of the plurality of dielectric layers, with the dielectric layer interposed; and a plurality of second groups of inner electrodes including a third inner electrode and a fourth inner electrode that are electrically connected with the second terminal electrode and that are mutually adjacent in the direction of lamination with the dielectric layer interposed; wherein, in the element, the plurality of first groups of inner electrodes and the plurality of second groups of inner electrodes are alternately arranged in the direction of lamination such that the second inner electrode and the third inner electrode are mutually adjacent in the direction of lamination with the dielectric layer interposed, and a outline of a portion of the first inner electrode located within the element is located further outside than a outline of a portion of the second inner electrode located within the element, as seen from the direction of lamination, and a outline of a portion of the third inner electrode located within the element is located further outside than a outline of a portion of the fourth inner electrode located within the element, as seen from the direction of lamination.

In the multilayer capacitor according to the present invention, the outline of the portion of the first inner electrode located within the element is located further outside then the outline of the portion of the second inner electrode located within the element, as seen from the direction of lamination. Consequently, variability of the area of overlap of the first inner electrode and the second inner electrode in the direction of lamination can be suppressed. The outline of the portion of the third inner electrode located within the element is located further outside than the outline of the portion of the fourth inner electrode located within the element, as seen from the direction of lamination. Consequently, variability of the area of overlap of the third inner electrode and the fourth inner electrode in the direction of lamination can be suppressed. Variability of the electrostatic capacity due to variability of the locations of the first to the fourth inner electrodes can therefore be reduced.

BRIEF DESCRIPTION OF THE DRAWINGS

FIG. 8 is a cross-sectional view of an aggregate formed in the step of manufacturing a multilayer capacitor according to this embodiment.

DESCRIPTION OF THE PREFERRED EMBODIMENTS

A preferred embodiment for putting the present invention into practice is described in detail below with reference to the appended drawings. Repetition in the description of the drawings is avoided by attaching the same reference symbols to identical elements.

Figure 1:
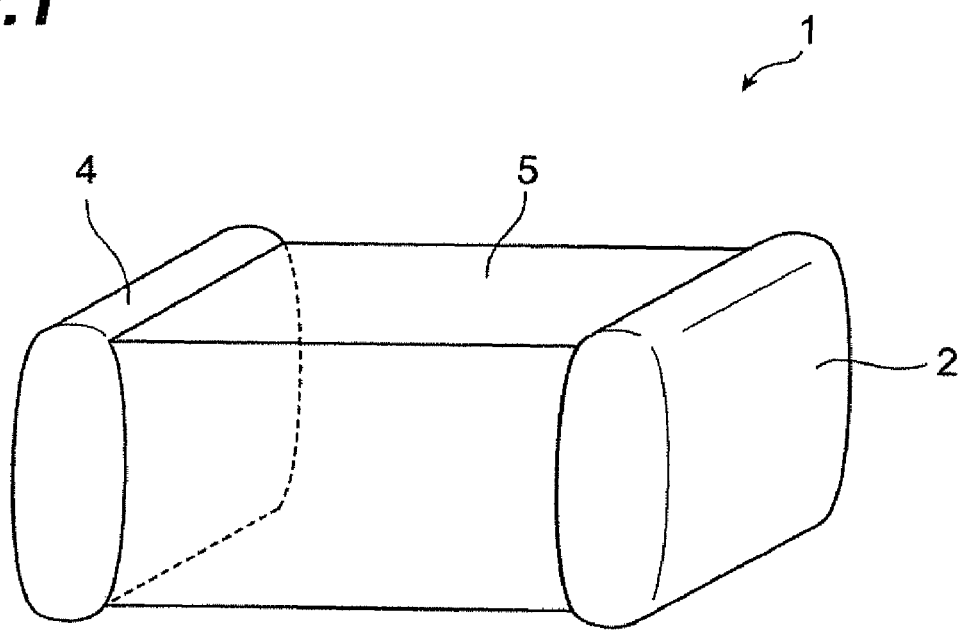
FIG. 1 is a perspective view of a multilayer capacitor according to this embodiment.

FIG. 1 is a perspective view of a multilayer capacitor 1 according to this embodiment. As shown in FIG. 1, the multilayer capacitor 1 comprises an element 5 of substantially rectangular prismatic shape, and a pair of first terminal electrode 2 and second terminal electrode 4 formed on this element 5.

The element 5 comprises a pair of end faces facing the longitudinal direction of the element 5, a pair of side faces facing the direction of lamination of the element 5, and a pair of side faces facing the direction perpendicular to the longitudinal direction and direction of lamination. The first terminal electrode 2 covers the entire surface of one end face and furthermore is formed with part thereof extending round onto the side faces. The second terminal electrode 4 is formed covering the entire surface of the other end face and furthermore with part thereof extending round onto the side faces. The side face of one or other of the pair of side faces facing the lamination direction of the element 5 is a face facing the external circuit board in question when the multilayer capacitor 1 is mounted on an external circuit board.

Figure 2:
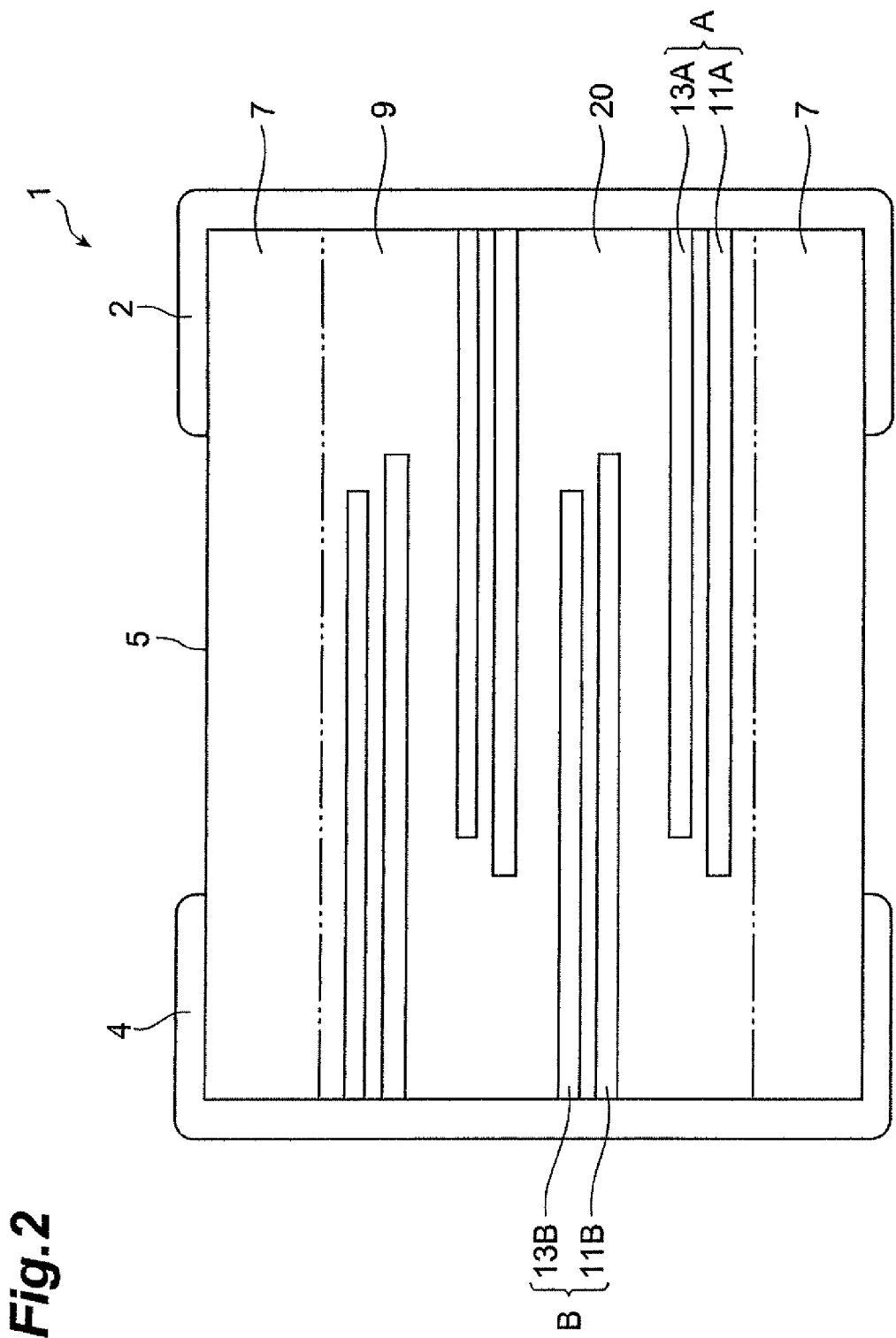
FIG. 2 is a cross-sectional view of a multilayer capacitor according to this embodiment.

The construction of the element 5 will be described with reference to FIG. 2. FIG. 2 is a cross-sectional view of a multilayer capacitor 1 according to this embodiment. The element 5 comprises two external layer sections 7 formed by lamination of a plurality of dielectric layers 20, and an inner layer section 9 formed by lamination of a plurality of dielectric layers. The inner layer section 9 is positioned between these two external layer sections 7. A plurality of internal electrodes that are laminated with interposition of dielectric layers 20 are formed in the inner layer section 9. The inner layer section 9 has the function of generating the electrostatic capacity component of the multilayer capacitor 1. The external layer sections 7 have the function of adjusting the thickness dimension of the multilayer capacitor 1 and of protecting the inner layer section 9.

In the inner layer section 9, there are formed first internal electrode groups A including first internal electrodes 11A and second internal electrodes 13A electrically connected with the first terminal electrode 2. In this embodiment, two pairs of the first internal electrode groups A are formed. One side of the first internal electrodes 11A and the second internal electrodes 13A formed in rectangular shape is exposed at the end face where the first terminal electrode 2 is formed, and is thus mechanically and electrically connected with the first terminal electrode 2. The first internal electrodes 11A and the second internal electrodes 13A that are included in the first internal electrode groups A are laminated so as to be mutually adjacent in the direction of lamination of the dielectric layers 20, with interposition of the dielectric layers 20.

In the inner layer section 9, there are formed second internal electrode groups B including third internal electrodes 11B and fourth internal electrodes 13B connected with the second terminal electrode 4. In this embodiment, two pairs of the second internal electrode groups B are formed. One side of the third internal electrodes 11B and the fourth internal electrodes 13B formed in rectangular shape is exposed at the end face where the second terminal electrode 4 is formed, and is thus mechanically and electrically connected with the second terminal electrode 4. The third internal electrodes 11B and the fourth internal electrodes 13B that are included in the second internal electrode groups B are laminated so as to be mutually adjacent in the direction of lamination of the dielectric layers 20, with interposition of the dielectric layers 20.

The first internal electrode groups A and the second internal electrode groups B are arranged alternately in the direction of lamination. The first internal electrode groups A and the second internal electrode groups B are laminated such that the second internal electrodes 13A and the third internal electrodes 11B are mutually adjacent in the direction of lamination, with interposition of the dielectric layers 20. The first internal electrode groups A are laminated offset towards the first terminal electrode 2. The second internal electrode group B is laminated offset towards the second terminal electrode group 4. The first internal electrode groups A and the second internal electrode groups B are laminated mutually offset by a prescribed dimension.

In this embodiment, the thickness of the first internal electrodes 11A, the second internal electrodes 13A, the third internal electrodes 11B and the fourth internal electrodes 13B is about 1.5 μm. The thickness of the dielectric layer 20 between the first internal electrode 11A and the second internal electrode 13A included in the first internal electrode groups A constituting a pair and the thickness of the dielectric layer 20 between the first internal electrode 11B and the second internal electrode 13B included in the second internal electrode groups B are about the same (these thicknesses are specified as D1, as shown in FIG. 2). The thickness D1 may be for example about 1.3 μm.

The thickness of the dielectric layer 20 between the second internal electrodes 13A and the first internal electrodes 11B that are adjacent to the second internal electrodes 13A with the dielectric layer 20 interposed and the thickness of the dielectric layer 20 between the second internal electrodes 13B and the first internal electrodes 11A that are adjacent to the second internal electrodes 13B with the dielectric layer 20 interposed are about the same (these thicknesses are specified as D2, as shown in FIG. 2). The thickness D2 may be for example about 2.5 μm.

The electrostatic capacity of the multilayer capacitor 1 is chiefly generated between the second internal electrodes 13A and the first internal electrodes 11B that are adjacent to the second internal electrodes 13A with interposition of the dielectric layers 20, and between the second internal electrodes 13B and the first internal electrodes 11A that are adjacent to the second internal electrodes 13B with interposition of the dielectric layers 20. That is, the electrostatic capacity of the multilayer capacitor 1 depends chiefly on the thickness D2.

Figure 3:
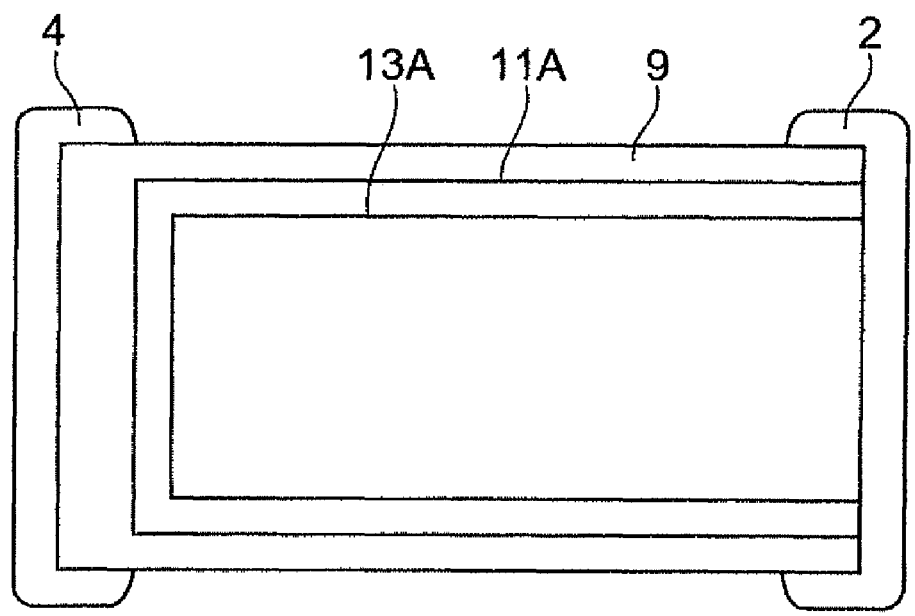
FIG. 3 is a diagram given in explanation of the first inner electrode and second inner electrode contained in the multilayer capacitor according to this embodiment.

The first internal electrodes 11A and the second internal electrodes 13A will be described in more detail with reference to FIG. 3. FIG. 3 is a diagram given in explanation of the first internal electrodes 11A and the second internal electrodes 13A. FIG. 3 is a view seen from above of the first internal electrodes 11A and second internal electrodes 13A in FIG. 2.

The first internal electrodes 11A and the second internal electrodes 13A are substantially of the same shape. The area of the first internal electrodes 11A is larger than the area of the second internal electrodes 13A. The outline of the portion of the first internal electrodes 11A located in the element 5 is located outside the outline of the portion of the second internal electrodes 13A located within the element 5, as seen from the direction of lamination. For example, the outline of the portion of the first internal electrodes 11A located within the element 5 is located about 30 μm on the outside of the outline of the portion of the second internal electrodes 13A located within the element 5, as seen from the direction of lamination.

Figure 4:
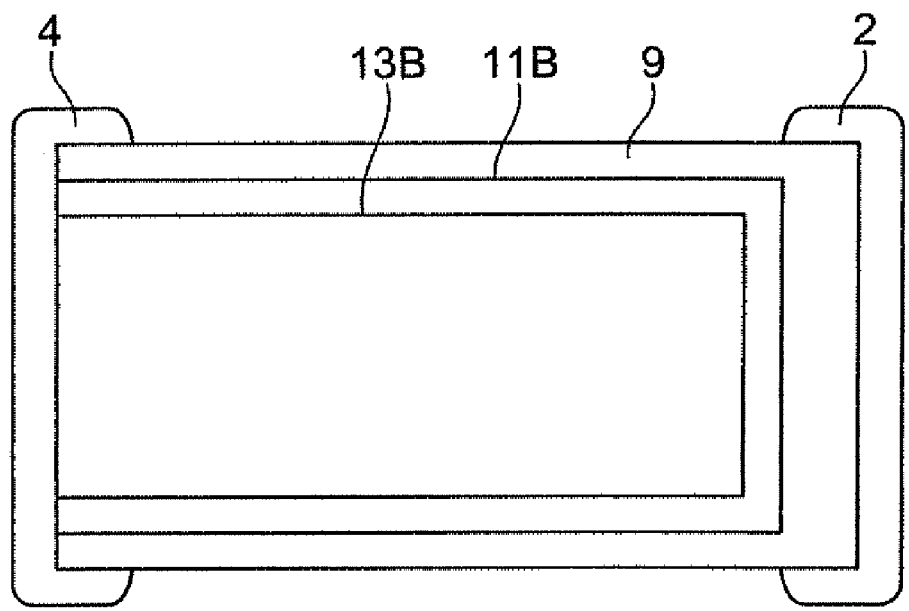
FIG. 4 is a diagram given in explanation of the third inner electrode and fourth inner electrode contained in the multilayer capacitor according to this embodiment.

The third internal electrodes 11B and the fourth internal electrodes 13B are described in more detail with reference to FIG. 4. FIG. 4 is a diagram given in explanation of the third internal electrodes 11B and the fourth internal electrodes 13B. FIG. 4 is a view seen from above of the third internal electrodes 11B and the fourth internal electrodes 13B in FIG. 2.

The third internal electrodes 11B and the fourth internal electrodes 13B are of substantially the same shape. The area of the third internal electrodes 11B is larger than the area of the fourth internal electrodes 13B. The outline of the portion of the third internal electrodes 11B located in the element 5 is located outside the outline of the portion of the fourth internal electrodes 13B located within the element 5, as seen from the direction of lamination. For example, the outline of the portion of the third internal electrodes 11B located within the element 5 is located about 30 μm on the outside of the outline of the portion of the fourth internal electrodes 13B located within the element 5, as seen from the direction of lamination.

The first internal electrodes 11A and the third internal electrodes 11B are of substantially the same shape and about the same area. The second internal electrodes 13A and the fourth internal electrodes 13B are of substantially the same shape and about the same area.

Incidentally, conventional multilayer capacitors are known comprising an element formed by laminating alternately a plurality of internal electrodes and a plurality of dielectric layers, and first terminal electrodes and second terminal electrodes formed electrically connected with an internal electrode at the outer surface of the element. Laid-open Japanese Patent Application No. H. 6-349666 discloses a multilayer capacitor in which a first terminal electrode and a second terminal electrode are connected with each pair of mutually adjacent internal electrodes and a pair of internal electrodes connected with the first terminal electrode and a pair of internal electrodes that are connected with the second terminal electrode are alternately laminated.

The elements that are included in the above conventional multilayer capacitor and in the multilayer capacitor described in Laid-open Japanese Patent Application No. H. 6-349666 are formed by printing an electrode pattern comprising internal electrodes of a prescribed shape onto a dielectric layer in the form of a sheet and laminating a plurality of dielectric layers on which this electrode pattern is printed. There is variability of the position of printing of the electrode pattern in the direction perpendicular to the direction of lamination. Also, there is variability of the position of the electrode pattern in the direction perpendicular to the direction of lamination when the dielectric layers on which the electrode pattern is printed are laminated.

Consequently, in the case of a multilayer capacitor according to Laid-open Japanese Patent Application No. H. 6-349666, variability is produced in the area of mutual overlap between a pair of internal electrodes. As a result, the problem arises of even further increase in variability of the electrostatic capacity in a multilayer capacitor according to Laid-open Japanese Patent Application No. H. 6-349666.

With the multilayer capacitor 1 according to this embodiment, the outline of the portion of the first internal electrodes 11A located in the element 5 is located outside of the outline of the portion of the second internal electrodes 13A located in the element 5, as seen from the direction of lamination. Variability of the area of overlap of the first internal electrodes 11A and the second internal electrodes 13A in the direction of lamination can therefore be suppressed. The outline of the portion of the third internal electrodes 11B located in the element 5 is located outside of the outline of the portion of the fourth internal electrodes 13B located in the element 5, as seen from the direction of lamination. Variability of the area of overlap of the third internal electrodes 11B and the fourth internal electrodes 13B in the direction of lamination can therefore be suppressed. Variability of the electrostatic capacity produced by variability of the locations of the first to the fourth internal electrodes 11A, 13A, 11B and 13B can therefore be reduced.

Figure 5:
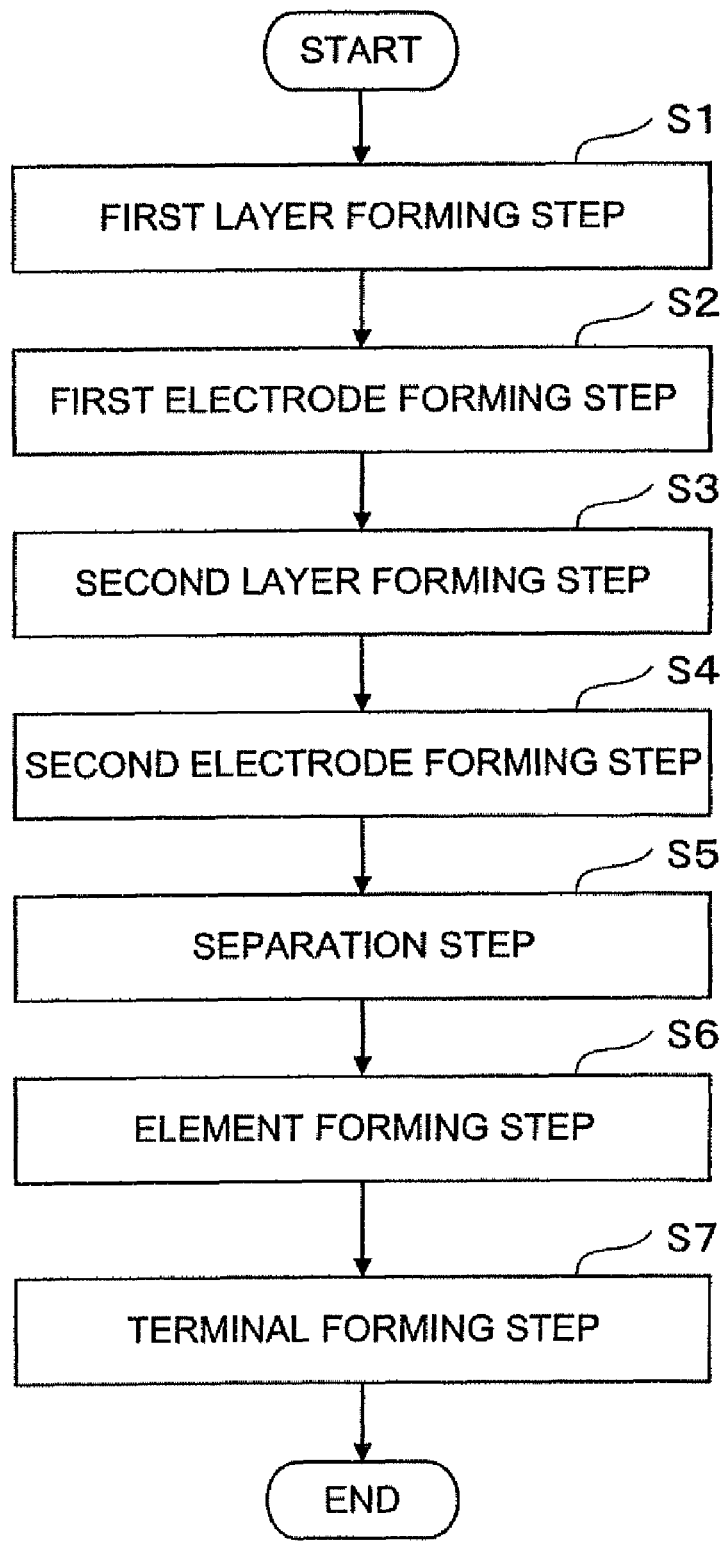
FIG. 5 is a flow chart showing the sequence of the method of manufacturing a multilayer capacitor according to this embodiment.

Next, a method of manufacturing the multilayer capacitor 1 according to this embodiment will be described. FIG. 5 shows the sequence of a method of manufacturing the multilayer capacitor 1 according to this embodiment. As shown in FIG. 5, the method of manufacturing the multilayer capacitor 1 according to this embodiment comprises the following steps: a first layer forming step S1, a first electrode forming step S2, a second layer forming step S3, a second electrode forming step S4, a separation step S5, an element forming step S6 and a terminal forming step S7.

Figure 6:
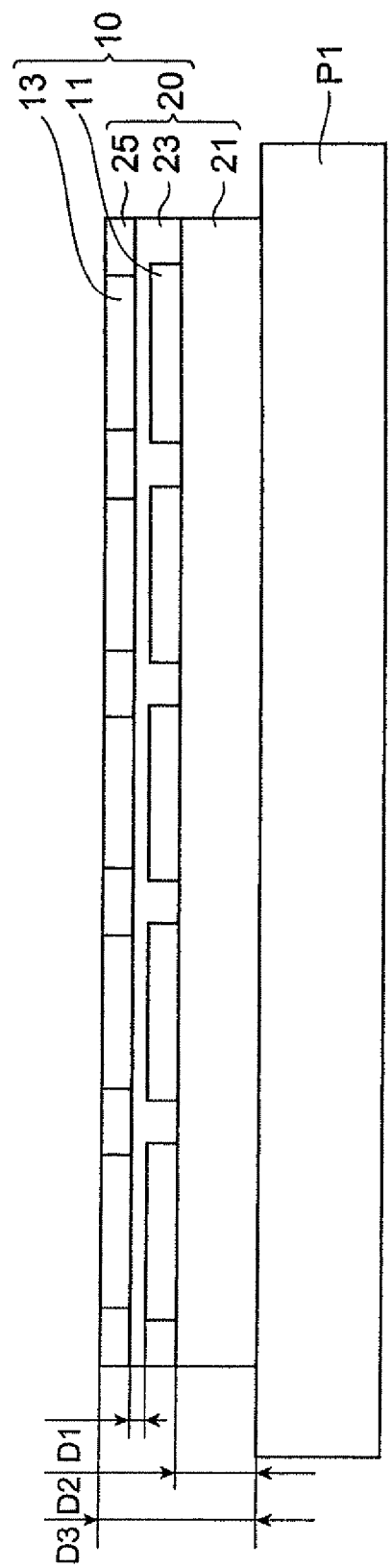
FIG. 6 is a cross-sectional view of a laminated body formed in the step of manufacturing a multilayer capacitor according to this embodiment.

First of all, as the process of forming a laminated body 10, the first layer forming step S1, the first electrode forming step S2, the second layer forming step S3, the second electrode forming step S4 and the separation step S5 will be described with reference to FIG. 6. FIG. 6 is a cross-sectional view of a laminated body 10 formed in the process of manufacturing the multilayer capacitor according to this embodiment.

In the first layer forming step S1, a first ceramic green layer 21 is formed on a PET (polyethylene terephthalate) film P1 (support body). The first ceramic green layer 21 is formed by applying a ceramic slurry onto the PET film P1, then drying. The ceramic slurry is obtained by adding for example a binder resin (such as for example an organic binder resin), solvent and plasticizer to a dielectric material whose chief constituent is barium titanate. The thickness D2 of the first ceramic green layer 21 is for example about 3.5 μm.

Next, in the first electrode forming step S2, a plurality of first electrode patterns 11 are formed on the upper surface of the first ceramic green layer 21. The first electrode patterns 11 are formed by printing electrode paste onto the upper surface of the first ceramic green layer 21, then drying. The electrode paste is a composition in the form of a paste obtained by mixing for example metal powder such as Ni, Ag or Pd with a binder resin and/or solvent. As printing means, for example screen printing may be employed. The thickness of the first electrode patterns 11 may be for example about 1.1 to 1.2 μm.

Next, in the second layer forming step S3, a second ceramic green layer 23 is formed on the upper surface of the first ceramic green layer 21 and the upper surface of the plurality of the first electrode patterns 11. The second ceramic green layer 23 is formed by applying a ceramic slurry, followed by drying, in the same way as the first ceramic green layer 23. The second ceramic green layer 23 covers the upper surface of the first electrode patterns 11. The ceramic slurry fills the spaces between the plurality of the first electrode patterns 11 so that the upper surface of the second ceramic green layer 23 is formed in planar fashion. The thickness of the second ceramic green layer 23 from the upper surface of the first electrode patterns 11 to the upper surface of the second ceramic green layer 23 is about 1.6 μm.

Next, in the second electrode forming step S4, a plurality of second electrode patterns 13 are formed. The second electrode patterns 13 are formed in locations respectively mutually overlapping, as seen from the lamination direction, with the plurality of the first electrode patterns 11, at the upper surface of the second ceramic green layer 23. The second electrode patterns 13 are formed by printing electrode paste, then drying, in the same way as the first electrode patterns 11. The thickness of the second electrode patterns 13 may be for example about 1.1 to 1.2 μm.

In the second electrode forming step S4, when the second electrode patterns 13 are printed, the second ceramic green layer 23 is dissolved by the solvent contained in the printed electrode paste, so there is a possibility that the second electrode patterns 13 and the first electrode patterns 11 may be electrically connected. As will be described, the first electrode patterns 11 and the second electrode patterns 13 are electrically connected with terminal electrodes of the same polarity. Consequently, in a multilayer capacitor according to this embodiment, there is no problem regarding performance, even in the case where the second electrode patterns 13 are electrically connected with the first electrode patterns 11.

After the second electrode forming step S4, an auxiliary layer 25 is formed on the second ceramic green layer 23 by printing and drying ceramic paste in the unused portions where no second electrode patterns 13 are formed. The aforementioned ceramic slurry may have the same constituents as the ceramic paste used to form the auxiliary layer 25, or may have different constituents. The thickness of the auxiliary layer 25 may be the same as the thickness of the second electrode pattern 13. By adopting such a construction, as will be described, it is possible to ensure that there is no difference in thickness when other layers are laminated onto the second electrode patterns 13. Consequently, lamination of these layers can be achieved with high precision. However, it should be noted that formation of an auxiliary layer 25 is not essential.

By the above steps, a laminated body 10 formed with the first ceramic green layer 21, the plurality of the first electrode patterns 11, the second ceramic green layer 23 and the plurality of the second electrode patterns 13 is completed. The thickness D3 of the laminated body 10 is about 7.3 to 7.5 μm.

Figure 7:
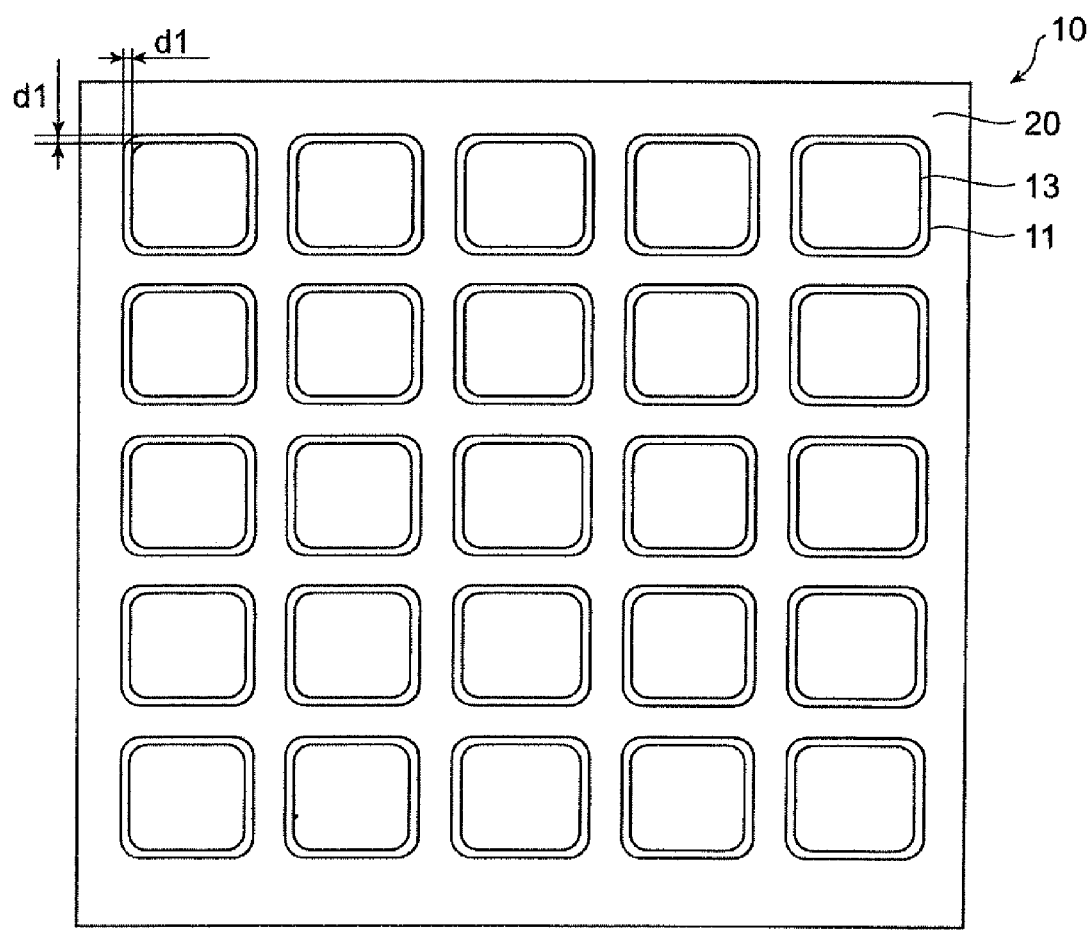
FIG. 7 is a plan view of a laminated body formed in the step of manufacturing a multilayer capacitor according to this embodiment.

Next, in the separation step S5, the PET film P1 is separated from the laminated body 10. The laminated body 10 that is thus formed is shown in FIG. 7. FIG. 7 is a plan view of a laminated body 10 formed in the process of manufacturing a multilayer capacitor 1 according to this embodiment.

As shown in FIG. 7, in the first electrode forming step S2, the plurality of the first electrode patterns 11 are formed, arranged in two-dimensional fashion. After this, the second ceramic green layer 23 is formed and then, in the second electrode forming step S4, the plurality of the second electrode patterns 13 are formed on the second ceramic green layer 23. This plurality of the second electrode patterns 13 are formed arranged in two-dimensional fashion so as to mutually overlap with the plurality of the first electrode patterns 11, respectively, as seen from the direction of lamination.

The first electrode patterns 11 and the second electrode patterns 13 are respectively substantially rectangular in shape and are formed so as to have substantially the same shape. In the second electrode forming step S4, the length of one side of the second electrode patterns 13 is formed to be 2·d1 shorter than the length of one side of the first electrode patterns 11, and the length of the other side of the second electrode patterns 13 is formed to be 2·d1 shorter than the length of the other side of the first electrode patterns 11. Specifically, the outline of the second electrode patterns 13 is formed so as to be located on the inside of the outline of the first electrode patterns 11 by a distance d1, as seen from the lamination direction of the first electrode patterns 11 and second electrode patterns 13. For example, the distance d1 may be about 30 μm.

Next, the element forming step S6 will be described with reference to FIG. 8. FIG. 8 is a cross-sectional view showing an aggregate 30 formed in the process of manufacturing a multilayer capacitor according to this embodiment. In the element forming step S6, a plurality of the laminated bodies 10 are prepared by separating the PET films P1 and the plurality of the laminated bodies 10 are laminated to form an aggregate 30. A plurality of the elements 5 are then formed by cutting the aggregate 30 that has thus been formed. For example, as shown in FIG. 8, four laminated bodies 10A to 10D are prepared, and the aggregate 30 is formed by laminating these prepared laminated bodies 10A to 10D. The aggregate 30 is formed by the external layer section 7 and the plurality of the laminated bodies 10A to 10D.

The aggregate 30 is formed by laminating and pressure fixing in this order the external layer section 7, the laminated body 10A, the laminated body 10B, the laminated body 10C, the laminated body 10D and the external layer section 7. The external layer section 7 is formed by laminating a plurality of ceramic green layers that are not formed with electrode patterns.

The laminated bodies 10A to 10D are laminated in such a way that the first electrode patterns 11 that are adjacent in the lamination direction are offset by a prescribed pitch in a prescribed direction of arrangement of the first electrode patterns 11. Specifically, the laminated bodies 10A to 10D are laminated offset by substantially half of a pattern in each layer in the direction that is perpendicular with respect to the direction of lamination and parallel with the prescribed direction of arrangement of the first and the second electrode patterns 11, 13. The laminated bodies 10 are laminated offset by an amount of dx/2, where dx is the interval of forming of the first electrode patterns 11 on the first ceramic green layer 21.

Next, the aggregate 30 is cut along first cutting planes (not shown) and second cutting planes L that are mutually orthogonal, to form a plurality of the elements 5. The first cutting planes are planes perpendicular with respect to the lamination direction and parallel with the prescribed direction of arrangement and are planes passing in between the first and second electrode patterns 11, 13 that are there arranged and formed. The second cutting planes L are planes that are perpendicular to the direction of lamination and the prescribed direction of arrangement and constitute planes passing through the middle of the first and the second electrode patterns 11, 13 and planes passing between the first and the second electrode patterns 11, 13.

After cutting, the binder contained in the first ceramic green layer 21, the second ceramic green layer 23 and the auxiliary layer 25 of the element 5 is removed and sintering is performed.

Next, the first terminal electrode 2 and the second terminal electrode 4 are formed on the outer surface of the element 5 in the terminal forming step S7. The first and the second terminal electrodes 2, 4 are formed on the respective facing cutting planes i.e. the cutting planes that are cut by the second cutting planes L in the element 5. The first electrode patterns 11 and the second electrode patterns 13 that are exposed at the side faces of the element 5 by cutting at the middle by the second cutting planes L are electrically connected through the first and second terminal electrodes 2, 4 that are thus formed.

For example, the first electrode patterns 11 and the second electrode patterns 13 that are cut at the middle sections and that are contained in the laminated body 10A and the laminated body 10C are connected with the first terminal electrode 2. The first electrode patterns 11 and the second electrode patterns 13 that are cut at the middle sections and that are contained in the laminated body 10B and the laminated body 10D are connected with the second terminal electrode 4.

The first electrode patterns 11 and the second electrode patterns 13 that are connected with the first terminal electrode 2 after such cutting at the middle section correspond with the first internal electrodes 11A and the second internal electrodes 13A of the multilayer capacitor 1 respectively described above. The first electrode patterns 11 and the second electrode patterns 13 that are connected with the second terminal electrode 4 after such cutting at the middle section correspond with the first internal electrode 11B and the second internal electrode 13B of the multilayer capacitor 1 respectively described above. The first ceramic green layer 21, the second ceramic green layer 23 and the auxiliary layer 25 constitute the dielectric layers 20. The multilayer capacitors 1 are completed by the steps described above.

The thickness D2 of the dielectric layer between the second internal electrode 13A and the first internal electrode 11B that is adjacent to the second internal electrode 13A with the dielectric layer therebetween in the multilayer capacitor 1 constructed in this way, and the thickness D2 of the dielectric layer between the second internal electrode 13B and the first internal electrode 11A that is adjacent to the second internal electrode 13B with the dielectric layer therebetween correspond to the thickness D2 of the first ceramic green layer 21. That is, the electrostatic capacity of the multilayer capacitor 1 depends chiefly on the thickness D2 of the first ceramic green layer 21.

The thickness D2 of the first ceramic green layer 21 is set in accordance with the desired electrostatic capacity of the multilayer capacitor 1. In addition, the thickness D3 of the laminated body 10 is set to a dimension such that the PET film P1 can easily be separated from the laminated bodies 10. The thickness D1 of the second ceramic green layer 23 is set such that the set thickness D3 of the laminated body 10 is obtained.

Next, the beneficial effect of the method of manufacturing the multilayer capacitor 1 according to this embodiment is described.

In the method of manufacturing the multilayer capacitor 1 according to this embodiment, the PET film is separated from the laminated body 10 after formation of the laminated body 10 formed with the first ceramic green layer 21, the first electrode patterns 11, the second ceramic green layer 23 and the second electrode patterns 13 on the PET film P1. Consequently, the thickness D3 of the laminated body 10 can be set to a greater value when separation is effected from the PET film P1 than in the case where separation is effected from the PET film P1 after lamination of a single ceramic green layer and a single electrode pattern. In this way, deformation of the releasing face of the PET film P1 in the laminated body 10 can be suppressed by facilitating separation of the PET film P1 from the laminated body 10. Consequently, the laminated body 10 is laminated in which there is little deformation of the releasing face, so lamination defects of the ceramic green layer in the multilayer capacitor 1 can be suppressed.

In the method of manufacturing a multilayer capacitor 1 according to this embodiment, the electrostatic capacity of the multilayer capacitor 1 can easily be adjusted by adjusting the thickness D2 of the first ceramic green layer 21 in the first layer forming step S1. The thickness D3 of the laminated body 10 on separation of the PET film P1 can be set to a thickness at which separation is easily achieved by adjusting the thickness D1 of the second ceramic layer 23.

In the above description, the thickness D2 of the first ceramic green layer 21 is set as about 3.5 μm, the thickness D1 of the dielectric layer between the upper surface of the first electrode patterns 11 and the lower surface of the second electrode patterns 13 is set as about 1.6 μm, and the thickness D3 of the laminated body 10 is set as about 7.3 to 7.5 μm. The value of the electrostatic capacity of the multilayer capacitor 1 can be made larger by for example making the thickness D2 of the first ceramic green layer 21 smaller than 3.5 μm. If this is done, in order to maintain the thickness D3 of the laminated body 10 at about 7.3 to 7.5 μm, which is a thickness at which this can easily be separated from the PET film P1, the thickness D1 of the dielectric layer between the upper surface of the first electrode patterns 11 and the lower surface of the second electrode patterns 13 can be increased.

In the method of manufacturing the multilayer capacitor 1 according to this embodiment, the plurality of the first electrode patterns 11 and the plurality of the second electrode patterns 13 are formed arranged two-dimensionally so as to mutually overlap and the aggregate 30 is formed by laminating the laminated bodies 10 in such a way that these are offset by the prescribed pitch, so the plurality of the elements 5 are formed by cutting at the first cutting planes and the second cutting planes L. Consequently, the multilayer capacitors 1 can be formed in a very efficient manner. Lamination defects of the ceramic green layers can therefore be suppressed, making it possible to manufacture the plurality of the multilayer capacitors 1 in an efficient manner.

In the method of manufacturing the multilayer capacitor 1 according to this embodiment, in the second electrode forming step S4, the outline of the second electrode patterns 13 is formed so as to be on the inside, as seen from the direction of lamination, of the outline of the first electrode patterns 11. Consequently, in the element 5, the outline of the second electrode patterns 13, excluding the cutting line produced by the second cutting planes L, is formed so as to be on the inside, as seen from the direction of lamination, of the outline of the corresponding the first electrode patterns 11. This makes it possible to suppress variability of the area of overlap of the first inner electrodes 11A and the second inner electrodes 13A and also the first inner electrodes 11B and the second inner electrodes 13B contained in the laminated body 10 of the element 5. Variability of the area of overlap, as seen from the direction of lamination, of the first inner electrodes 11A and second inner electrodes 13A and also the first inner electrodes 11B and the second inner electrodes 13B contained in one laminated body 10 with another adjacent laminated body can thereby be suppressed. Variability of the electrostatic capacity of the multilayer capacitor 1 can therefore be suppressed.

What is claimed is:

1. A method of manufacturing a multilayer capacitor comprising:
    a first layer forming step of forming a first ceramic green layer on a support body;
    a first electrode forming step of forming a first electrode pattern on an upper surface of the first ceramic green layer;
    a second layer forming step of forming a second ceramic green layer by laminating onto the upper surface of the first ceramic green layer and an upper surface of the first electrode pattern;
    a second electrode forming step of forming a second electrode pattern at an upper surface of the second ceramic green layer in a location where the second electrode pattern and the first electrode pattern mutually overlap as seen from a direction of lamination;
    a separation step of separation the support body from a laminated body obtained by laminating the first ceramic green layer, the first electrode pattern, the second ceramic green layer and the second electrode pattern;
    an element forming step of preparing a plurality of the laminated bodies from which the support bodies are separated and forming an element by laminating the plurality of the laminated bodies such that, for two mutually adjacent laminated bodies, the second electrode pattern of one laminated body is in contact with the first ceramic green layer of the other laminated body; and
    a terminal forming step of forming a first terminal electrode on an outer surface of the element such as to connect with the first electrode pattern and the second electrode pattern included in a prescribed laminated body of the plurality of the laminated bodies and forming a second terminal electrode on the outer surface of the element such as to connect with the first electrode pattern and the second electrode pattern included in a prescribed laminated body of the plurality of the laminated bodies.

2. The method of manufacturing the multilayer capacitor according to claim 1 wherein:
    in the first electrode forming step, a plurality of the first electrode patterns are formed arranged in two-dimensional fashion;
    in the second layer forming step, the second ceramic green layer is formed laminated on the upper surface of the first ceramic green layer and an upper surface of the plurality of the first electrode patterns;
    in the second electrode forming step, a plurality of the second electrode patterns are formed arranged in two-dimensional fashion so as to mutually overlap with the plurality of the first electrode patterns, respectively, seen from the direction of lamination, at the upper surface of the second ceramic green layer;
    in the element forming step, an aggregate is formed by laminating the plurality of the laminated bodies such that the first electrode patterns that are adjacent in the lamination direction of these laminated bodies are offset by a prescribed pitch in a prescribed direction of arrangement of the first electrode patterns; and a plurality of the elements are formed by cutting the aggregate at first cutting planes passing between adjacent the first electrode patterns that are parallel with the prescribed direction of arrangement, and at second cutting planes, which are planes between adjacent the first electrode patterns that are perpendicular to the prescribed direction of arrangement and planes passing through a centers of the first electrode patterns that are perpendicular to the prescribed direction of arrangement.

3. The method of manufacturing the multilayer capacitor according to claim 2, wherein in the second electrode forming step, the second electrode pattern is formed such that an outline of the second electrode pattern is further on the inside as seen from the direction of lamination than an outline of the first electrode pattern.

4. The method of manufacturing the multilayer capacitor according to claim 3, wherein in the first layer forming step, an electrostatic capacity of the multilayer capacitor is adjusted by adjusting a thickness of the first ceramic green layer.

5. The method of manufacturing the multilayer capacitor according to claim 1, wherein in the first layer forming step, an electrostatic capacity of the multilayer capacitor is adjusted by adjusting a thickness of the first ceramic green layer.

6. The method of manufacturing the multilayer capacitor according to claim 5, wherein in the second electrode forming step, the second electrode pattern is formed such that an outline of the second electrode pattern is further on the inside as seen from the direction of lamination than an outline of the first electrode pattern.

7. The method of manufacturing the multilayer capacitor according to claim 1, wherein in the second electrode forming step, the second electrode pattern is formed such that an outline of the second electrode pattern is further on the inside as seen from the direction of lamination than an outline of the first electrode pattern.

* * * * *